Dec. 10, 1968  A. L. CHEUNG  3,415,226
BIRD FEEDER
Filed Aug. 5, 1966
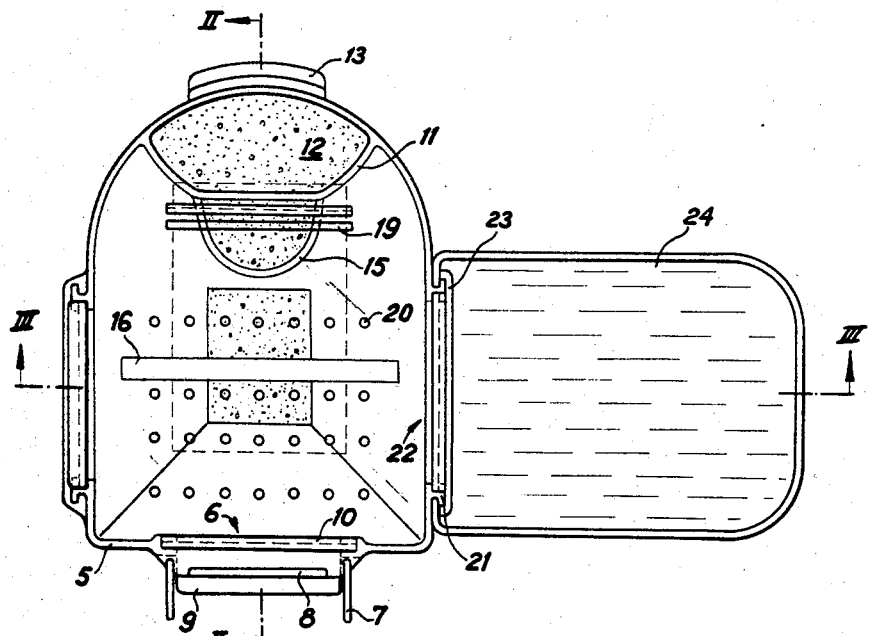
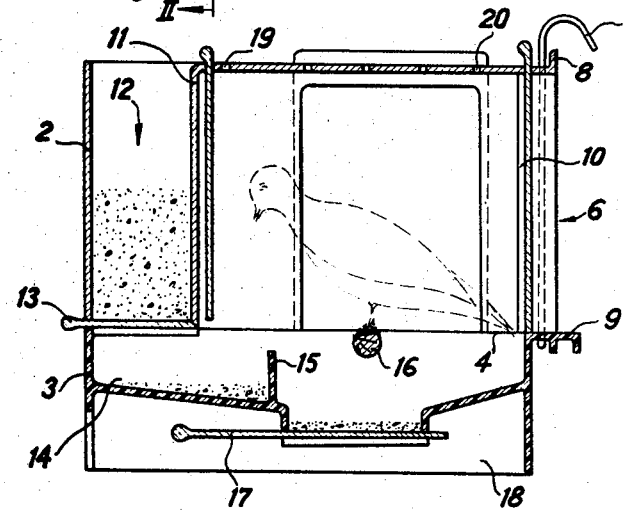
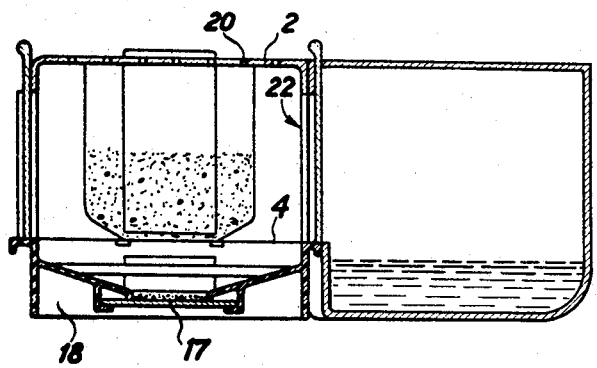
ALAN L. CHEUNG
INVENTOR.
BY *James E. Sauer*

Patent text

3,415,226
BIRD FEEDER
Alan L. Cheung, 9 Park Vale St.,
Brookline, Mass. 02146
Filed Aug. 5, 1966, Ser. No. 570,634
4 Claims. (Cl. 119—18)

ABSTRACT OF THE DISCLOSURE

The disclosed bird feeder is just large enough to completely contain a feeding bird, and will catch and hold the seeds and husks naturally scattered by the bird as it feeds. The feeder includes structure for attaching its entrance against the open door of a bird cage, and for selectively closing the entrance.

---

This invention relates to a bird feeder that catches and holds the seeds and husks naturally scattered by a caged bird as it feeds.

As any caged bird feeds, it naturally scatters seeds and husks in all directions. The usual feeder for caged birds is little more than a cup hooked to the cage. Seeds are easily scattered from it all over the cage and the surrounding area of the home. As a result the cage and surrounding area must be cleaned constantly. Were it not for this seed and husk litter, the cage would require very little attention to maintain a clean and healthy environment for the bird.

This invention provides a bird feeder that catches and holds the litter naturally scattered by a feeding bird. By using this feeder, the seed and husk litter is completely contained within the feeder for easy disposal, and the cage remains neat and clean.

The bird feeder is formed by a housing large enough to contain a feeding bird. The housing has an opening in one end wall through which a bird may pass from the cage into the feeder. Structure is provided to attach the feeder to an ordinary wire bird cage with the opening in the end wall of the housing aligned with the door opening of the cage. Attached to another wall of the housing is a generally vertical container for holding a supply of seeds. A sliding door member closes the bottom of this container and may be retracted to allow the seeds to fall by gravity into a feeding tray beneath the container. The floor of the housing has an opening, preferably in front of the feeding tray, and a second sliding door closes this opening. The seed and husk litter scattered from the feeding tray by a pet bird is captured by the walls of the housing and falls to the floor. It may be emptied by sliding open the door in the floor, allowing the litter to fall through the opening into a waste receptacle.

The invention will be further described in connection with the accompanying drawing, in which:

FIG. 1 is a top view of the bird feeder;
FIG. 2 is a longitudinal side view of the bird feeder taken along lines II—II of FIG. 1; and
FIG. 3 is a lateral side view of reduced scale taken along lines III—III of FIG. 1.

The bird feeder, generally designated by a reference character 1, is formed by a housing large enough to contain a feeding bird. The housing includes a top portion 2 and a floor portion 3 attached together along a margin 4. Preferably both portions of the housing are formed of a plastic material, such as polystyrene, the top portion being transparent and the base portion opaque.

One end wall 5 of the top portion includes an opening 6. Structure is provided for attaching the housing to a bird cage with this opening aligned with a door of the cage, and for holding the door open so that a bird may move freely through the opening and between the cage and the feeder. This structure includes a wire rod 7 fixed to the top portion and bent to hook into the wire mesh of a common bird cage, and a vertical tab 8 projecting upward from the top of the housing to hook behind the raised door of the cage to hold it open. The base portion may include a first perch 9 which extends over the sill of the bird cage door. Preferably the center portion of the wire rod 7 passes under this perch and reinforces the structure.

To attach the bird feeder to a common wire mesh bird cage, the door of the cage is raised and the vertical tab 8 passed under it as the perch 9 is slipped over the sill and the hooks set onto the wire mesh of the cage. The hooks hold the housing to the cage and the vertical tab holds the door raised so that a bird may pass freely between the wire cage and the feeder. The first perch 9 extends through the bottom portion of the door opening and into the wire cage. To close this door opening without removing the feeder, a door panel 10 may be passed through an opening in the top portion of the housing and along a vertical channel to bear on the perch 9, as shown best in FIG. 2.

Spaced from the outer wall of the top portion of the housing is a second wall 11 which cooperates with the adjacent wall to form a vertical feed storage column or container 12 for bird seed. The top of this container is open to permit bird seed to be poured into the feed storage column. The bottom of the container is closed by a sliding door 13 received in a channel formed by opposed angle members of the top portion. A feeding tray 14, defined by an upstanding wall 15 of the base portion, lies generally beneath the container 12. By retracting the sliding door 13, seed in the feed storage column is allowed to fall past the front edge of the door and fill the feeding tray. A wooden perch rod 16 is set in notches in the base portion, and spans the floor of the feeder in front of the feeding tray to support a feeding bird.

As any bird feeds, it will naturally flick seed and husk away from the feeding area. When feeding at the tray 14, this thrown litter is captured and contained by the walls of the housing, and falls to the floor. Preferably the floor of the housing slopes downward toward the center, as shown, so that this captured litter collects in one place. A second sliding door 17 is received between opposed angle members of the base portion defining a channel, as shown in FIG. 3, and closes an opening in the center of the floor. By retracting this sliding door 17, the litter settling to the central area of the floor will fall through the opening and into a waste receptacle. In this manner, the bird feeder may be thoroughly cleaned both quickly and easily. Any bird droppings on the sliding door panel will be scraped therefrom by the leading edge of the opening in the floor, and will fall with the litter into the waste receptacle. Preferably a skirt 18 extends around the edge of the base portion to enhance the appearance of the feeder and to provide a level base for supporting the feeder on a horizontal surface. The top portion or ceiling of the housing may include slots 19 in front of the container for holding sliding door panels, such as door 10 or 17, when not in use (which doors preferably are identical in size and shape). The bird feeder also may be used as a bird carrier by closing all the door openings. A series of holes 20 are provided in the ceiling of the top portion to insure adequate ventilation for a bird in the feeder.

The side walls of the bird feeder may incorporate structure to attach accessories, such as a bird bath, to the feeder. Such structure includes vertical bars 21 extending along an opening 22 in the side wall of the top portion, and a second perch 23 projecting from the base portion beneath the opening. A bird bath 24, or other accessory includes inwardly extending edge portion which are received in outwardly extending lip portions of the vertical bars 21 and are supported by the perch 23. Preferably the accessory is of approximately the same height as the bird feeder, and its marginal areas surrounding the opening bear on the side wall of the feeder for added support, particularly against torsional forces. A sliding door, similar in form to doors 10 and 17, may be received in the inwardly extending lip portions of the vertical bars to close the opening 22 so that the accessory may be removed. Similar structure may be provided in the opposite side wall of the feeder for another accessory, or as another door.

While the preferred embodiment of the invention has been illustrated and described, various modifications may occur to, or be preferred by, others skilled in this art. Accordingly the invention is defined by the following claims.

I claim:

1. A bird feeder comprising a housing large enough to contain a feeding bird, means for capturing bird food scattered by a feeding bird within the housing including a top portion and a base portion, the top portion and the base portion being secured together along a margin, the top portion including an opening in one wall through which a bird may pass, means to attach the housing to a bird cage with the opening in the wall of the housing generally aligned with a door opening in the cage, means to hold the door of the cage open and permit a bird to pass freely between the cage and the feeder, a second wall fixed to a wall of the housing opposite the opening and defining a generally vertical container for bird food between the two walls, a sliding door extending between the two walls and closing the bottom opening of the container for selectively discharging bird food therefrom, the base portion including upstanding ridges forming a feeding tray area generally beneath the container, a perch extending across the housing next to the feeding tray, the base portion including a floor which slopes downwardly towards a central opening therein, a second sliding door, and means attaching the second sliding door to the base portion for selectively exposing the opening in the base portion and permitting discharge of scattered bird food litter falling to the floor of the housing through the opening in the base portion.

2. A bird feeder as set forth in claim 1 including a second opening in the walls of the housing through which a bird may pass, and means for attaching an accessory such as a bird bath or a second bird feeder about the second opening.

3. A bird feeder as set forth in claim 2 including a third sliding door at least as large as one of the openings in the walls of the housing, and means for receiving and holding the third sliding door spanning one of the openings in the walls of the housing.

4. A bird feeder as set forth in claim 3 including a slot in the top portion of the housing for receiving at least one of the sliding doors.

References Cited

UNITED STATES PATENTS

| | | | |
|---|---|---|---|
| 2,031,874 | 2/1936 | Butler et al. | 119—18 |
| 2,482,675 | 9/1949 | Lamb | 119—56 |

HUGH R. CHAMBLEE, *Primary Examiner.*